Aug. 21, 1956 F. N. WILLIAMSON ET AL 2,760,005
TELEPHONE CALL ORIGINATOR
Filed March 7, 1955
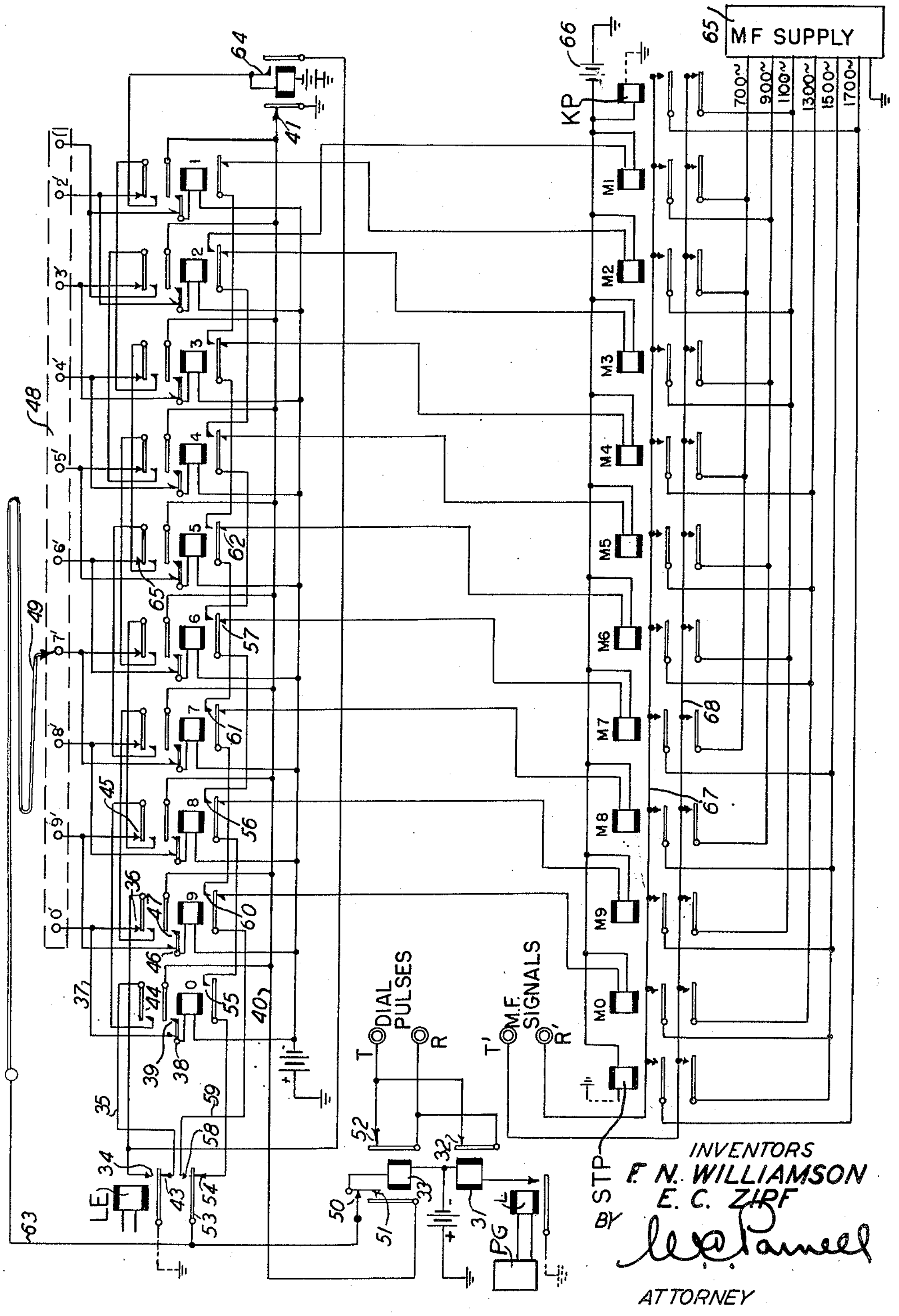
INVENTORS
F. N. WILLIAMSON
E. C. ZIRF
BY W. C. Parnell
ATTORNEY 2,760,005
Patented Aug. 21, 1956

2,760,005

TELEPHONE CALL ORIGINATOR

Fred N. Williamson, Morristown, N. J., and Edward C. Zipf, Bronx, N. Y., assignors to Western Electric Company, Incorporated, New York, N. Y., a corporation of New York Application March 7, 1955, Serial No. 492,468

3 Claims. (Cl. 179—90)

This invention relates to telephone systems and particularly to apparatus for testing the traffic handling capacity of telephone equipment.

As is well known in the art, the operation of a telephone dial generates a series of dial pulses representing the number of the called party. Since it is impracticable to transmit these pulses over long distances, it is the practice, in connection with long distance calls, to translate the dial pulses into combinations of frequencies for more efficient transmission. Each digit of such a call is received as a distinctive pair of signal frequencies selected from a multi-frequency group such as 700, 900, 1100, 1300, 1500 and 1700 cycles per second. Central offices, therefore, must be equipped to handle simultaneously a certain number of both dial pulse and multi-frequency calls.

It also is common practice to test the traffic handling capacity of such equipment by making or simulating a number of simultaneous telephone calls and observing how the equipment functions under the imposed load. For this purpose call originators of various types have been developed heretofore. Some of these prior call originators can simulate only dial pulse calls while others can simulate only multi-frequency calls. A complete test of the common equipment used in handling both types of call requires that both types of call be originated simultaneously and that extreme service conditions be accurately simulated. To do this with the test apparatus heretofore available was a difficult and cumbersome procedure. Due to the fact that each call originator was capable of simulating only one type of call, a good deal of test equipment was required and since the dial pulse and multi-frequency call originators functioned independently of each other, there was no means of knowing definitely that a desired maximum load was actually being placed on the equipment.

The object of this invention is a relatively simple and compact apparatus which can provide both dial pulse and multi-frequency signals in properly timed relation to each other.

According to the general features of the invention, a pulse generating circuit pulsing at the normal dial pulse rate operates in cyclic sequence a chain of ten digit steering relays for supplying pulses in succession to the terminals of a ten position digit control switch. For any setting of the switch the operation of the corresponding steering relay conditions a dial pulse circuit to transmit the pulses generated upon the operation of the remaining relays of the chain.

For multi-frequency pulsing ten other relays, one for each digit, are interconnected with the steering relays so that the one corresponding to the digit to be "dialed" is operated at the time the dial pulse circuit is made operative and is released when the next lower numbered steering relay operates. While the relay is operated the two frequencies representing the digit are connected to the line. At each position of the digit control switch, therefore, both the dial pulses and the corresponding frequencies representing a digit of a telephone call are made available for connection to the lines or trunks to be tested and by moving the digit control switch to other positions in succession all of the digits of a telephone call are simulated.

These and other features of the invention will be clearly understood from the following description and the accompanying drawing showing a call originator according to the invention.

In the drawing, the pulse generator PG and associated circuits including relays L and LE, not being a part of this invention, are shown only diagrammatically. The pulse generator is a well known device in the telephone art for generating pulses at the rate of about fourteen per second to simulate the pulses generated by a telephone dial. The relays L and LE correspond to the similarly designated relays in an originating register of a crossbar telephone system as disclosed, for example, in Patent 2,616,974 granted to J. W. Dehn, November 4, 1952. Relay L follows the dial pulses from the pulse generator PG and relay LE vibrates at one-half the rate of the L relay (about seven cycles per second) as in the originating register of the above patent so that contacts 34 and 58 or contacts 43 and 54 are closed simultaneously when the contacts of the L relay are open.

When the relays L and LE are vibrating in the manner just described, relay 31 will follow the L relay and the opening and closing of its contacts 32 will send pulses over a loop connected to T and R at dial speed rate during the time relay 33 is operated, as explained below. With the circuit in the condition shown, the next operation of the LE relay operates the steering relay 0 over a circuit extending from ground through relay contact 34, conductor 35, back contact 36 of steering relay 9, conductor 37, contact 38 and through the relay winding to the grounded battery as indicated. When relay 0 operates it locks up over a path from contacts 39 and conductor 40 through contacts 41 of the recycle relay 42 to ground.

When the LE relay releases, contact 43 closes and completes an operating circuit for steering relay 9 through contact 44 of relay 0, contact 45 of relay 8 and contact 46 of relay 9 to the winding of relay 9 which operates and locks up through its contact 47. In a similar manner in succeeding operations of the LE relay the remaining steering relays 8 to 1 will be operated and locked up in succession, the even numbered relays being operated through contact 34 and the odd numbered relays through contact 43 of the LE relay. The closing of these contacts to operate a steering relay also applies a momentary ground to the correspondingly numbered terminal of a digit control switch 48 having a contact arm 49 which may be moved successively to the positions corresponding to the digits of a telephone number to be "dialed." When this ground is applied to the contact with which the arm 49 is engaged, for example, contact 7′, as shown, relay 33 operates over an obvious circuit including its contact 50 and locks up through its contact 51 and contact 41 of relay 42. The operation of relay 33 opens contact 52 and the relay 31 is then effective to send out over the TR loop the seven pulses generated while the relays 6 to 1 and 42 are being operated.

The ground on the digit control switch terminal which operates relay 33 is applied also to armature 53 of the LE relay and is extended through contact 54, contacts 55 and 56 of the operated 0 and 8 relays, respectively, and the back contact 57 of the relay 6 to the winding of relay M7 and grounded battery 66. The operation of relay M7 connects the 700 and 1500 cycle frequencies from the multi-frequency supply source 65 to conductors 67, 68 and the terminals T′—R′ of the multi-frequency signal loop. These frequencies are connected to the loop only momentarily, however, since the M7 relay is released by the opening of contact 57 when relay 6 operates in response to the next closure of contact 34 of the LE relay. If the contact arm 49 is set on an even terminal such as 6′, the ground pulse on this terminal (from contact 34 of the LE relay through relays 9 and 7 operated and contact 65 of relay 5 released) which operates relay 33 to cause transmission of the six remaining pulses of the series, also extends through spring 53 and contact 58 of the LE relay, conductor 59, contacts 60 and 61 of the operated 9 and 7 relays and contact 62 of relay 5 to the winding of the M6 relay which operates to send out the 1100 and 1300 cycle frequencies corresponding to digit 6.

In a similar manner for any setting of the digit control switch, one of the relays M0 to M1 is operated momentarily to send out over the T′—R′ loop a pair of frequencies corresponding to the number of dial pulses sent out over the TR loop. It will be understood that in using the call originator these loops may be connected to multi-frequency and dial pulse distributors, respectively, so that the call can be sent over as many trunks as desired.

After all of the relays 0 to 1 have been operated and the dial pulses and the corresponding frequencies have been sent out, the next operation of the LE relay extends ground through its contact 34 and contacts of the 9, 7, 5, 3 and 1 relays to operate the recycle relay 42. The closing of contacts 4 holds the relay operated until contact 34 is opened on the next release of the LE relay thereby preventing a premature start of the next cycle. The opening of contact 41 releases all of the steering relays 0 to 1 in preparation for the next cycle and also releases relay 33, reclosing contact 52 to prevent relay 31 from transmitting any further pulses.

While a single manually operable digit control switch 48 has been shown for purposes of illustration it will be understood that in practice a digit control switch may be provided for each digit of the call to permit the preselection of any desired series of digits and a steering switch may then connect the digit control switches in turn to conductor 63 between successive cycles of operation of the steering relays.

As in any multi-frequency pulsing system, the KP relay is operated at the beginning of the calling cycle to send out the gate opening signal, namely, the 1100 and 1700 cycle frequencies, to condition the multi-frequency receiver to register the call. When all of the digits have been pulsed the STP relay is operated to send out the 1500 and 1700 cycle frequencies which are the marker start signal indicating that all of the digits of the call have been registered. The circuits for operating these relays form no part of this invention and may be found in such patents as 2,585,904 granted February 19, 1952, to A. J. Busch.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a call originator a dial pulse output circuit, a first relay for producing a series of simulated dial pulses in the circuit, a second relay normally disabling the first relay, means for automatically operating the second relay to enable the first relay to produce a desired number of pulses in the circuit comprising a chain of digital steering relays, an interrupter synchronized with the first relay for successively operating the steering relays, a digit control switch having a terminal in the operating circuit of each steering relay and a connection from a selected terminal to the second relay, a source of currents of different frequencies, a multi-frequency output circuit, a plurality of multi-frequency relays for connecting different frequencies to the multi-frequency output circuit, and an operating circuit for each multi-frequency relay including the selected terminal of the digit control switch, contacts on the interrupter and contacts on at least one steering relay.

2. In a call originator the combination with a source of dial pulses, a dial pulse output circuit, a chain of steering relays operated successively between successive dial pulses and means including a digit selector switch associated with the chain of relays for determining the number of pulses supplied to the output circuit, of a source of multi-frequency signals, an output circuit therefor and relay means for impressing thereon a multi-frequency signal corresponding to the number of pulses supplied to the dial pulse output circuit, said relay means comprising for each steering relay a multi-frequency relay having contacts for connecting to the multi-frequency output circuit the signal frequencies representing the digit of the corresponding steering relay and operating circuits for the multi-frequency relays extending through the digit selector switch.

3. In a call originator the combination with a source of dial pulses, a dial pulse output circuit, a chain of steering relays operated successively between successive dial pulses and means including a digit selector switch associated with the chain of relays for selectively operating one of the steering relays to determine the number of pulses supplied to the output circuit, of a source of multi-frequency signals, an output circuit therefor and relay means for impressing thereon a multi-frequency signal corresponding to the number of pulses supplied to the dial pulse output circuit, said relay means comprising for each steering relay a multi-frequency relay having contacts for connecting to the multi-frequency output circuit the signal frequencies representing the digit of the corresponding steering relay and a circuit for operating each multi-frequency relay when the corresponding steering relay is operated and normally closed contacts in the circuit opened by the next dial pulse for releasing the operated multi-frequency relay.

No references cited.